United States Patent [19]

Nobileau

[11] Patent Number: 4,865,364

[45] Date of Patent: Sep. 12, 1989

[54] CONICAL THREAD FORM

[75] Inventor: Philippe C. Nobileau, Paris, France

[73] Assignee: Vetco Gray Inc., Houston, Tex.

[21] Appl. No.: 215,016

[22] Filed: Jul. 5, 1988

[51] Int. Cl.⁴ .............................................. F16L 15/00

[52] U.S. Cl. ...................................... 285/334; 285/36; 285/333; 403/343

[58] Field of Search ............... 285/334, 333, 355, 390, 285/36; 403/343

[56] References Cited

U.S. PATENT DOCUMENTS

| | | | |
|---|---|---|---|
| 4,295,751 | 10/1981 | Holmberg | 285/334 X |
| 4,410,204 | 10/1983 | Reimert | 285/24 |
| 4,508,375 | 4/1985 | Patterson et al. | 285/334 |
| 4,549,754 | 10/1985 | Saunders et al. | 285/334 |
| 4,600,225 | 7/1986 | Blose | 285/333 X |
| 4,601,491 | 7/1986 | Bell, Jr. et al. | 285/24 |
| 4,673,201 | 6/1987 | Dearden et al. | 285/390 |
| 4,717,183 | 1/1988 | Nobileau | 285/334 |

FOREIGN PATENT DOCUMENTS

| | | | |
|---|---|---|---|
| 0199588 | 9/1958 | Austria | 285/333 |
| 0281659 | 7/1952 | Switzerland | 285/333 |
| 0560965 | 6/1977 | U.S.S.R. | 285/333 |
| 1151754 | 4/1985 | U.S.S.R. | 285/333 |
| 1189394 | 4/1970 | United Kingdom | 285/334 |

OTHER PUBLICATIONS

"Vam", British Steel Corp. Tubes Division, Vam Catalogue 850 (Haynes Cannon Ltd., Wellingsborough) 1986©, pp. 4,14,16.

World Oil's 1986 Tubing Tables, ©1986, Gulf Publishing Co., pp. 37,41,45,46,48,50,55,56,58,61.

*Primary Examiner*—Randolph A. Reese
*Assistant Examiner*—Paul M. Frechette
*Attorney, Agent, or Firm*—James E. Bradley

[57] ABSTRACT

A connector for connecting two pipes has threads configured to improve making up in severe motion conditions. The connector includes a pin and a box, each having frusto-conical surfaces with helical threads formed on them. The threads have multiple starts for rapid make up. The crest of each thread is truncated and is a frusto-conical surface. This frusto-conical surface is inverted to the frusto-conical surface of the portions of the pin and box that contain threads. Each thread has a load flank and a stabbing flank. The stabbing flank inclines and joins a link flank, which in turn joins a root. The link flank inclines at a different and steeper angle than the stabbing flank.

2 Claims, 4 Drawing Sheets

CONICAL THREAD FORM

BACKGROUND OF THE INVENTION

1. Field of the Invention

This invention relates in general to tubular connections, comprising pin and box members threaded together.

2. Description of the Prior Art

In my U.S. Pat. No. 4,717,183, issued Jan. 5, 1988, I disclose a conical thread configuration for rapid makeup connection. That connection is particularly suitable for sections of large diameter pipe used in the offshore drilling industry. These pipes are used for well casings, well conductors and other purposes. It is important to be able to make up these connections rapidly because of the motions of the floating vessel.

In the U.S. Pat. No. 4,717,183, the threaded configuration will make up in less than one turn, and in the preferred embodiment one-fourth of a turn. Each set of threads includes multiple separate threads, each starting separately for rapid make up. Each thread has abutting load flanks, inclined stabbing flanks, and cylindrical, truncated crests.

SUMMARY OF THE INVENTION

In this invention, the connector assembly includes pin and box members, each having a set of conically tapered threads. The threads have a stabbing flank and a load flank. The load flanks abut when the thread is fully connected. The crest of each thread is truncated and tapers in a direction opposite to the taper of the conical surfaces. Also, the stabbing flank is joined to the root by a link flank. The link flank also inclines, but at a steeper amount.

DESCRIPTION OF THE PREFERRED EMBODIMENT

Figure 1:
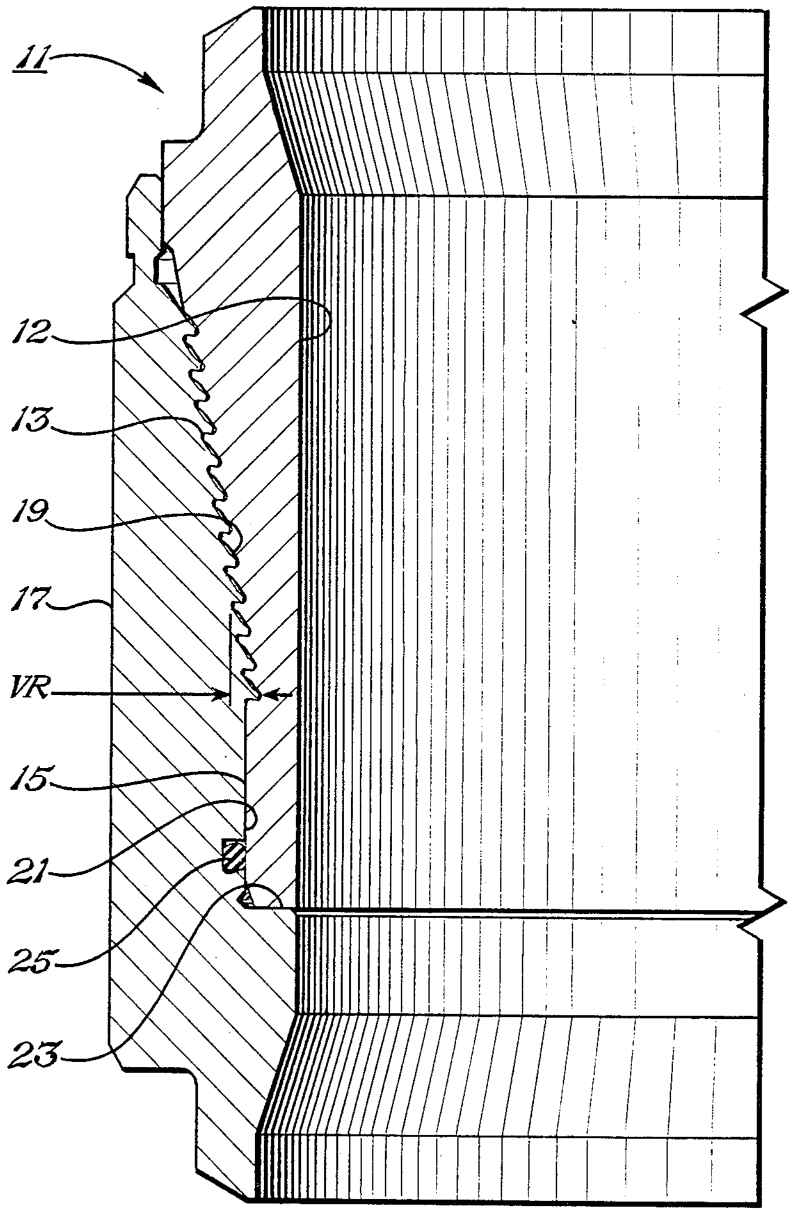
FIG. 1 is a vertical sectional view of a portion of a connector assembly constructed in accordance with this invention.

Referring to FIG. 1, a pin 11 is adapted to be secured to a pipe (not shown) that typically will be about 20 inches in diameter. Pin 11 is a tubular male member having a bore 12 extending through it. Pin 11 has a set of threads 13 formed on it. Threads 13 are in a frusto-conical configuration. The threads 13 taper inwardly into a nose 15. The nose 15 is cylindrical, and extends downward from the lower termination of the threads 13.

The pin 11 is adapted to mate inside a box 17. Box 17 is a female connection that will be secured to another pipe. Box 17 has a set of threads 19 that mate with the pin threads 13. Threads 19 are formed in a frusto-conical section of the bore of the box 17. The frusto-conical section diverges as it proceeds toward the open upper end of the box 17. Box 17 has a cylindrical counterbore 21 that closely receives the pin nose 15. An upward facing shoulder 23 is located at the lower end of the counterbore 21. The end of the nose 15 contacts the shoulder 23 when the threads 13, 19 are fully made up. A seal 25 located in the counterbore 21 seals against the nose 15.

Figure 2:
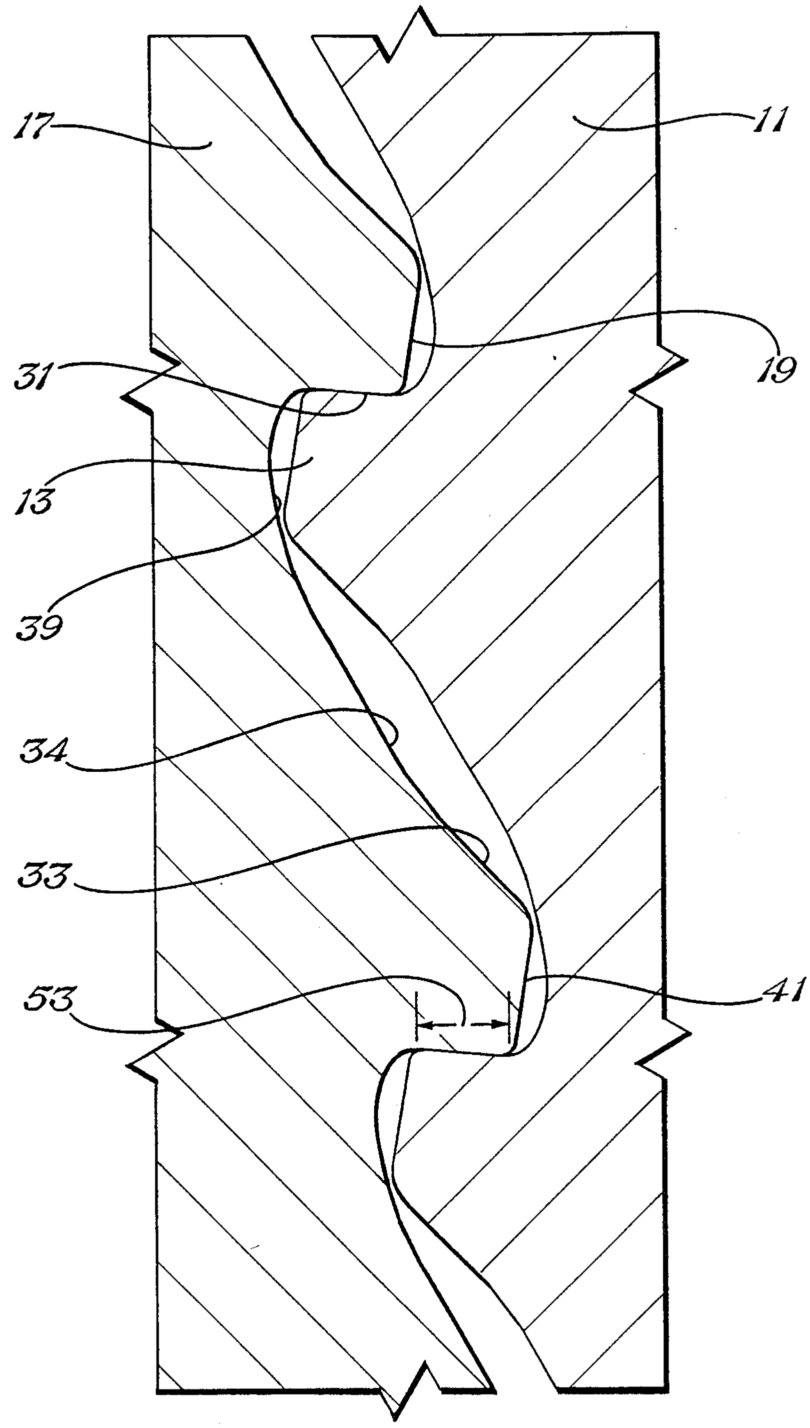
FIG. 2 is an enlarged view of a portion of the threads of the connector assembly of FIG. 1, shown connected.
Figure 3:
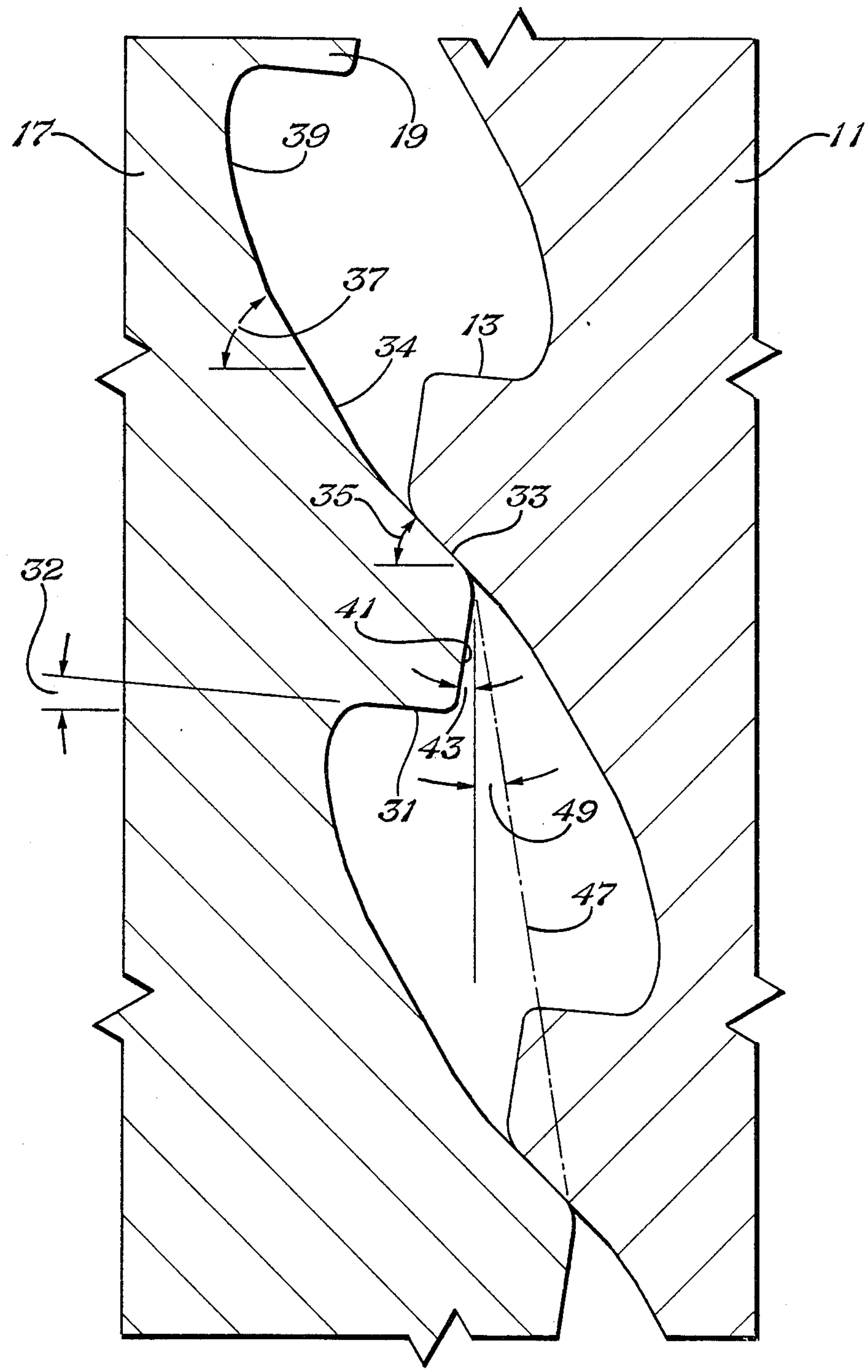
FIG. 3 is an enlarged view of a portion of the threads of the connector assembly of FIG. 1, and shown in the stabbing position.

Referring to FIG. 3, in the preferred embodiment, the threads 13, 19 are of a multiple-start type. Preferably there are four separate helical threads that extend from the upper to the lower end of each threaded section 13, 19. These threads allow a rapid make up in less than one turn of the pin 11 from the stabbing position shown in FIG. 3 to the fully made up position shown in FIG. 2. The geometry of the threads that allows the rapid make up is shown and described in more detail in U.S. Pat. No. 4,717,183, all of which material is hereby incorporated by reference.

Referring to FIG. 3, each of the threads 13, 19 has a load flank 31 also referred to as a second flank 31. The load flank 31 inclines at a small angle 32 relative to a plane perpendicular to the longitudinal axes of the pin 11 and box 17. This angle 32 is preferably about 5 degrees. The load flanks 31 will abut when fully made up as shown in FIG. 2.

Each of the thread 13, 19 also has a stabbing flank 33 also referred to as a first flank. The stabbing flank 33 is located on the opposite side of each thread from the load flank 31. Stabbing flank 33 is a frusto-conical surface. Stabbing flank 33 inclines at an angle 35 relative to a plane perpendicular to the longitudinal axis. Angle 35 is preferably about 45 degrees. The stabbing flank 33 extends for a distance that is only slightly greater than the length of the load flank 31.

The stabbing flank 33 joins a link flank 34. The link flank 34, similar to the stabbing flank 33, is a straight, frusto-conical surface. The link flank 34 also inclines relative to a plane perpendicular to the longitudinal axis. It inclines at an angle 37 that is greater than the angle 35. Preferably, the link flank 34 inclines at an angle 37 of about 60 degrees relative to a plane perpendicular to the longitudinal axis.

The link flank 34 joins a curved root 39. The root 39 joins the load flank 31 of the next thread at a smooth radius. A crest 41 is located at the extremity of each thread 13, 19. Crest 41 is blunt or truncated. Crest 41 joins the load flank 31 with the stabbing flank 33. A radius is formed at each junction.

The crest 41, which appears as a straight inclined line in the sectional view, is a straight frusto-conical surface. Crest 41 inclines at an angle 43 relative to a longitudinal axis. The divergence of the frusto-conical surface of the crests 41 is in the opposite direction to the frusto-conical surfaces of the pin 11 and box 17 on which the threads 13, 19 are formed. Angle 43 is preferably 10 degrees. The length of crest 41 is less than one-fourth the distance from one load flank 31 to the next load flank 31.

The junctions of the stabbing flanks 33 with the crests 41 provide corresponding points which define a frusto-conical surface of revolution 47. This frusto-conical surface of revolution 47 intersects the longitudinal axis at an angle 49. The frusto-conical surface of the crest 41 is inverted relative to the frusto-conical surface of revolution 47. Angle 49 is approximately the same as angle 43, which is about 10 degrees.

Referring to FIG. 1, with four separate threads starts, spacing the shoulder 23 to obtain a one-fourth turn make up produces an overlap of VR/4. The distance VR is the radial distance between a point on a crest 41 and the same point on the same thread one full revolution away. As shown in FIG. 2, the overlap 53 between the abutting load flanks 31 is smaller than one-half of VR (FIG. 1). In the preferred embodiment, overlap 53 is equal to one-fourth of the distance VR.

In operation, pin 11 will be axially stabbed into the box 17. Initially, the stabbing flanks 33 will contact each other, as shown in FIG. 3. The nose 15 will be spaced above the shoulder 23. Rotation of about one-fourth turn causes the stabbing flanks 33 to slide on one another into the position shown in FIG. 2. In that position, the load flanks 31 will be overlapping and abutting tightly against each other. A clearance will exist between the stabbing flanks 33. The nose 15 will be in contact with the shoulder 23. However, in the preferred embodiment, rotation will stop not by the contact of the nose 15 with the shoulder 23, rather by bottoming out of the threads 13, 19.

Figure 4:
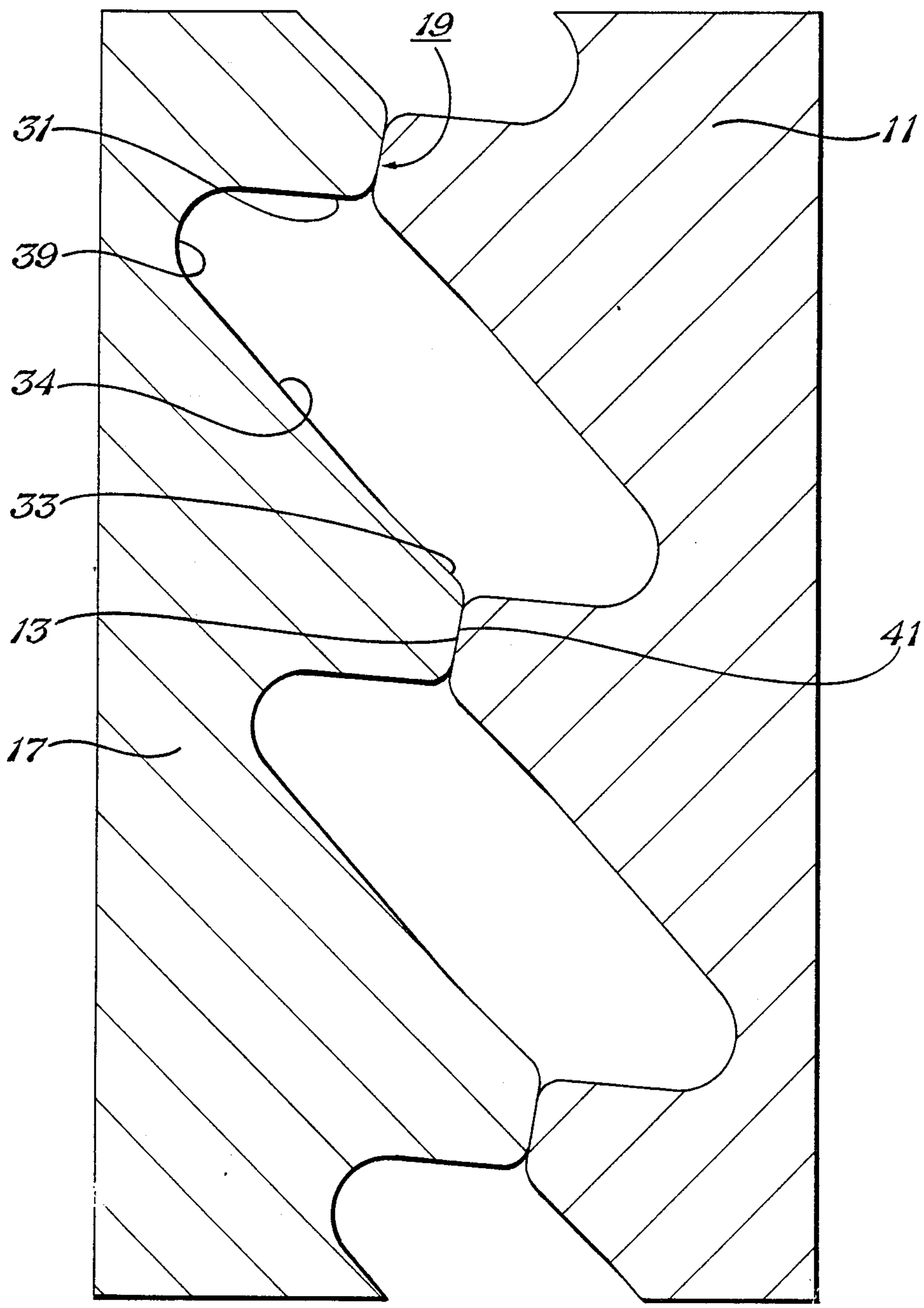
FIG. 4 illustrates a portion of the threads of a connector assembly constructed in accordance with this invention, and shown in a position with the crests of the threads contacting each other.

Referring to FIG. 4, the pin 11 may be inclined slightly relative to the axis of the box 17 while stabbing. If so, one side of the threads 13, 19 may engage each other in a crest 41 to crest 41 contact. Because of the inverted inclined slope of the crests 41, there will be no structure preventing the pin 11 from sliding downward relative to the box 17. The crests 41 touch each other, but cannot jam. Rotation will bring the pin 11 into axial alignment with the box 17 and fully make up the threads 13, 19.

The invention has significant advantages. The inverted conical surfaces of the crests prevent the possibility of crest-to-crest jamming. The two separate slopes of the stabbing flank and the link flank on the back profile of the thread reduce the amount of torque required to rotate the two members. The thread form will mate with the prior thread form shown in U.S. Pat. No. 4,717,183, allowing interchangeability.

While the invention has been shown in only one of its forms, it should be apparent to those skilled in the art that it is not so limited, but is susceptible to various changes without departing from the scope of the invention. For example, the inverted inclined crests and other features of the invention are not limited to the thread form shown in U.S. Pat. No. 4,717,183, but are applicable to other thread types, whether multiple start rapid make-up or single start types.

I claim:

1. A connector assembly, comprising:

pin and box members, each having a longitudinal axis;

each member having a plurality of helical threads formed thereon, the threads of one member being complementary to the threads of the other member;

each thread having a truncated crest, a first flank on one side of the crest and a second flank on the other side of the crest, the first and second flanks each lying at an angle relative to a plane perpendicular to the longitudinal axis, said angle of the first flank being greater than said angle of the second flank;

each thread having a link flank joining the first flank, the link flank and the second flank of the next thread being separated by a curved root;

the first flank inclining relative to a plane perpendicular to the axis, the link flank inclining relative to said plane at a greater inclination than the first flank;

the second flanks of the members when fully mated being in contact and overlapping;

the junction of the first flank and the crest defining points forming an axially extending frusto-conical surface of revolution; and the crest of each thread being a frusto-conical surface that tapers in a direction opposite to said frusto-conical surface of revolution, the frusto-conical surfaces of the crests of the pin member converging from the first flanks to the second flanks, the frusto-conical surfaces of the crests of the box member diverging from the first flanks to the second flanks.

2. A connector assembly, comprising:

mateable pin and box members, each having a longitudinal axis;

each member having a plurality of helical threads with corresponding points forming an axially extending frusto-conical surface of revolution;

each thread having a truncated crest, a first flank on one side of the crest and a second flank on the other side of the crest, the first and second flanks each lying at an angle relative to a plane perpendicular to the longitudinal axis, said angle of the first flank being greater than said angle of the second flank;

each thread having a link flank joining the first flank, the link flank and the second flank of the next thread being separated by a curved root;

the first flank being a frusto-conical surface inclining relative to a plane perpendicular to the longitudinal axis, the link flank being a frusto-conical surface inclining relative to said plane at a greater inclination than the first flank;

the second flanks of the members when fully mated being in contact and overlapping;

the junction of the first flank and the crest defining points forming an axially extending frusto-conical surface of revolution; and the crest of each thread being a frusto-conical surface that tapers in a direction opposite to said frusto-conical surface of revolution, the frusto-conical surfaces of the crests of the pin member converging from the first flanks to the second flanks, the frusto-conical surfaces of the crests of the box member diverging from the first flanks to the second flanks.

* * * * *